United States Patent [19]

Frutschi

[11] Patent Number: 5,386,687
[45] Date of Patent: Feb. 7, 1995

[54] METHOD OF OPERATING A GAS TURBINE GROUP

[75] Inventor: Hans U. Frutschi, Riniken, Switzerland

[73] Assignee: Asea Brown Boveri Ltd., Baden, Switzerland

[21] Appl. No.: 208,184

[22] Filed: Mar. 10, 1994

Related U.S. Application Data

[63] Continuation of Ser. No. 36,270, Mar. 24, 1993, abandoned.

[30] Foreign Application Priority Data

Apr. 21, 1992 [DE] Germany .............................. 4213023

[51] Int. Cl.$^6$ ............................................. F02C 7/16
[52] U.S. Cl. .................................. 60/39.04; 60/39.17; 60/727
[58] Field of Search ............... 60/39.02, 39.04, 39.161, 60/39.17, 39.52, 39.75, 727

[56] References Cited

U.S. PATENT DOCUMENTS 2,988,884 6/1961 Pouit ................................. 60/39.17
4,522,024 6/1985 Zaugg ................................. 60/727

FOREIGN PATENT DOCUMENTS 2102770 8/1972 Germany .
2335594 8/1974 Germany .
2702440 7/1978 Germany .
3447717A1 7/1985 Germany .
4106752A1 9/1991 Germany .
4109259A1 10/1991 Germany .
4103228A1 8/1992 Germany .

Primary Examiner—Louis J. Casaregola
Attorney, Agent, or Firm—Burns, Doane, Swecker & Mathis

[57] ABSTRACT

In a method for operating a gas turbine group (32) having an integrated steam process (33) and having an air storage installation (34), a partial mass flow (17) is extracted from a high-pressure turbine (15) of the gas turbine group (32) and passed through a heat exchanger (20) for cooling one or a plurality of structures of the gas turbine group (32). This heat exchanger (20) is operated by a cooler medium (4, 6). The partial mass flow (17) cooled in this way is subsequently passed through the structures (18, 19) to be cooled of the gas turbine group (32). By this means, the cooling is achieved of, in particular, the structures installed downstream of the high-pressure turbine (15). The heat generator (18) connected downstream and the low-pressure turbine (19) can be connected in parallel or in series. It is therefore possible to achieve cooling of the loaded structures of the gas turbine group (32) without, in the process, affecting the working gas balance of the installation.

14 Claims, 1 Drawing Sheet

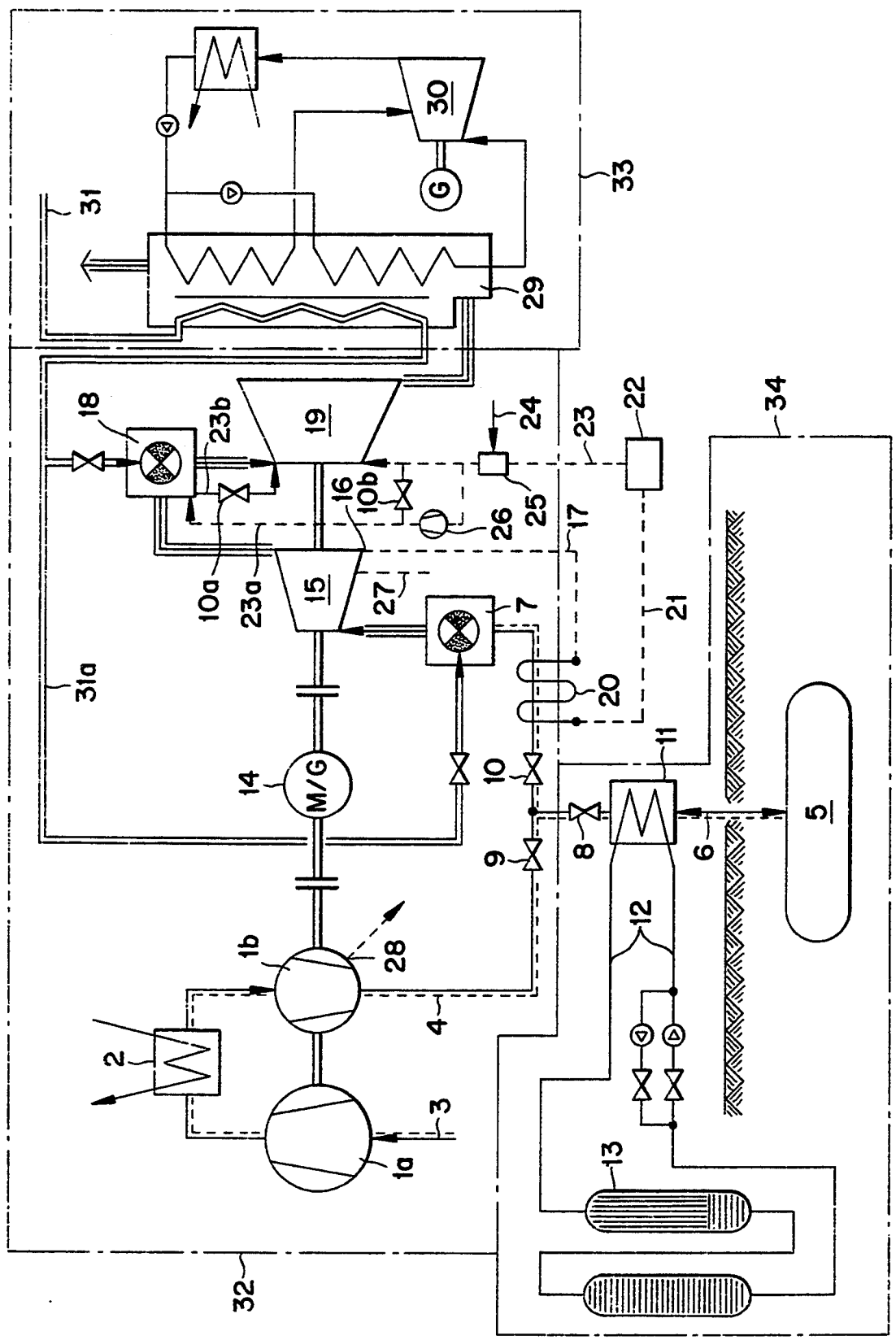

METHOD OF OPERATING A GAS TURBINE GROUP

This application is a continuation of application Ser. No. 08/036,270, filed Mar. 24, 1993 (abandoned).

BACKGROUND OF THE INVENTION

1. Field of the Invention

The present invention relates to a method for operating a gas turbine group.

2. Discussion of Background

In a thermal power station installation, in particular an air storage installation, particular problems can arise with respect to the turbine cooling. These occur because of the very high pressure ratios of approximately 30:1 to 70:1 necessary for compatibility with an economically tolerable compressed-air reservoir. This very high pressure ratio demands, again for economic reasons, at least one reheat stage in the turbine expansion. The heat or temperature drop for the high-pressure turbine, referred to below as the HP turbine, is then substantially smaller than that of the low-pressure turbine, referred to below as the LP turbine. In an air storage gas turbine, in which the compressor is equipped with an intercooling system, compressed air is delivered to a storage cavern by the electrical machine, operated as a motor. An air/water heat exchanger cools the heated compressed air coming from the last compressor unit for the purpose of reducing its specific volume and transfers the heat into a pressurized-water accumulator installation, the corresponding shut-off elements being open during this so-called charge operation.

If electrical energy now has to be generated from the stored compressed air, the compressor group is shut down by means of a control system. The turbine group which, for example, comprises an HP turbine, an LP turbine and the electrical machine, now operated as a generator, is started by opening the corresponding closing element. This takes place initially simply by means of compressed air from the reservoir, which compressed air is preheated in the heat exchanger by the stored hot water. The production of electrical energy can be undertaken after ignition in the combustion chamber. It is, however, also possible to let the installation operate as a through-connected gas turbine by appropriate disposition of the shut-off elements and couplings. It is then possible to store some air at the same time or to extract some from the cavern.

Such an installation can no longer meet the present-day economic specifications with respect to reducing the fuel consumption and the position is aggravated by the fact that such installations are not in a position to satisfy the maximum pollutant emission figures which now have to be demonstrated. It is, in fact, correct that a waste heat boiler can be added for generating steam. The steam generated in this way can be supplied to a steam turbine group or it is directly supplied to the gas turbine group in accordance with known methods. The question of whether one or the other method of utilizing the steam is preferred depends on the duration of the turbine operation. Steam injection is correct for less than approximately 2-4 hours per day.

If such a thermal power station installation is now optimized, the hot gas temperatures corresponding to the prior art at inlet to the HP turbine produce such a high outlet temperature of the combustion gases from the HP turbine that these gases cannot be used directly as coolant for the LP turbine. For this reason, the turbine is usually cooled by cooling air which is extracted before the cavern of the air storage installation, as is usual for the cooling of turbines. In through-connected gas turbine operation, it is of course possible to avoid throttling losses by extracting the cooling air leading to the turbine at a compressor location which is appropriate with respect to pressure. Whereas, for a given mixed temperature at inlet to the turbine, the consumption of cooling air for the turbine reduces the turbine efficiency mainly because of mixing losses, the consumption of cooling air for the LP turbine has very disadvantageous effects because this cooling air bypasses the HP turbine and, therefore, does no work in it.

SUMMARY OF THE INVENTION

Accordingly, one object of this invention, as claimed in the claims, is to propose measures, in a method of the type quoted at the beginning, which introduce an improvement in the economy and minimize the pollutant emissions by cooling one or a plurality of structures in the gas turbine group and can, in consequence, obviate the disadvantages presented above.

The essential advantage of the invention may be seen in the fact that the cooling of the structures, for example the heat generator at the low-pressure end, the LP turbine, etc takes place by means of a certain quantity of exhaust gases from the HP turbine, this partial gas flow being preferably led through a heat exchanger before it is used, there being a flow of cooling air from the gas turbine group or from the air storage installation through this heat exchanger.

Furthermore, there is no difficulty about activating a steam quantity from the steam cycle as the cooling medium for the heat exchanger.

A further possibility consists in effecting the cooling of the partial gas flow directly by spraying in water and/or steam.

A further advantage of the invention may be seen in the fact that the partial gas flow can flow through the gas turbine group structures to be cooled in parallel or in series.

Advantageous and expedient further developments of the solution to the object of the invention are claimed in the further claims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the single FIGURE shows a circuit by means of which the cooling of the LP turbine is effected by means of exhaust gases from the HP turbine.

DESCRIPTION OF THE PREFERRED EMBODIMENTS

Referring now to the drawing, the FIGURE shows an air storage gas turbine comprising a gas turbine group 32, an air storage installation 34 and a steam cycle 33, in which the exhaust gases from the gas turbine group 32 are thermally utilized in the manner of a combined installation. A compressor group, in the gas turbine group 32, comprising a first compressor 1a, a second compressor 1b and an intercooler 2 connected between them, compresses the induced air 3 and delivers it via a conduit 4 into a cavern 5 of the air storage installation 34. This delivery of the compressed air to the cavern 5 takes place via a further conduit 6 which branches off from the first conduit 4. The conduit 4 is also the delivery line to a first heat generator 7 of the gas turbine group 32, a series of actuating elements undertaking the operational interconnection of the conduits 4, 6.

The conduit 6 to the cavern 5 has, firstly, an actuating element 8 immediately after it branches from the conduit 4, two further actuating elements 9, 10 upstream and downstream of the same ensuring that the respective conduit can be switched on. Delivery of the compressed air to the cavern 5 takes place when the first actuating element 9 in the conduit 4 and the actuating element 8 in the conduit 6 are open whereas the second actuating element 10 in the conduit 4 remains closed. The installation is through-connected and operated as a pure gas turbine group by closing the actuating element 8 in the conduit 6 and simultaneously opening the two actuating elements 9, 10.

A heat exchanger 11, which is connected to a heat accumulator 13 via a conduit system 12, acts downstream of the actuating element 8 in the conduit 6 to the cavern 5. This accumulator 13 accepts the compression enthalpy of the last compressor stage 1b, the compressor being driven by the electrical machine 14, operating as a motor and the energy to be stored being therefore drawn from the electrical grid. The compression enthalpy contained in the heat accumulator 13 is re-supplied to the cold storage air during discharge operation so that the work capacity of the cold storage air increases.

It has been found that further raising the temperature of the working medium by means of a heat generator, perhaps operated with a gaseous fuel, increases the work capacity by a further significant amount. This is of great economic advantage because the additional investment is small compared with the gain in work. This is the only possible way of operating an air storage power station profitably. Account must also, however, be taken of the fact that the air pressure must be set as high as possible in order to keep the costs of the cavern 5 as low as possible; 50 to 70 bar is the rule. Such a high pressure, however, favors the occurrence of $NO_x$ in the first heat generator 7 upstream of an HP turbine 15 to which these hot gases are to be admitted. This is not permissible from the ecological point of view. Help can be provided by appropriate means, such as spraying in ammonia at a suitable location.

What does have to be provided, on the other hand, relates to the cooling of the thermally loaded units the gas turbine group 32. The figure shows a circuit in which the cooling of the LP turbine 19 takes place by means of exhaust gases from the HP turbine 15. A partial gas flow is taken from the HP turbine 15 at an appropriate extraction location 16 via a cooling gas conduit 17 and is led to a heat exchanger 20. The remaining, major exhaust gas flow from the HP turbine 15 is led into a further downstream heat generator 18 in which this exhaust gas is again thermally prepared before it is admitted to the LP turbine 19. The heat exchanger 20 mentioned acts in the air conduit 4, the exhaust gas flow 17, which is much too hot for cooling purposes, being cooled by heat exchange with the relatively cold compressed air 4. The heat exchanger 20 can also, of course, be located in a partial flow of the air conduit 4, which partial flow is then appropriately more strongly heated.

This relatively strongly preheated working air can then be introduced at an appropriate location into the heat generator 7 at the high-pressure end via a conduit, which is not represented. Account has then to be taken of the fact that the air flowing through the conduit 4 has relatively low temperatures.

The heat exchanger 20 can be operated with a relatively cold air mass flow both in through-connected operation of the gas turbine group 32 and in discharge operation of the air storage installation 34. In through-connected operation of the gas turbine group 32, the intercooling in the compressor group, by the intercooler 2, ensures that the temperature level remains low. In discharge operation of the air storage installation 34, a temperature level of approximately 200° C. is present, which lies substantially below the usual cooling air temperature level of 360°–400° C.

In order to increase the pressure drop of the cooling flow, the partial cooling gas quantity 17, which is extracted from the HP turbine 15 for purposes of cooling the various structures of the gas turbine group, is preferably extracted before the end of expansion of the turbine 15, as is symbolized by the tapping conduit 27.

The structures mentioned can be connected in parallel or in series, depending on the degree of thermal loading and the cooling potential of the partial cooling gas quantity 17. In the case of parallel connection, the partial cooling gas flow 23 is divided, for example after the booster fan 26, into two flows of which one flows through the LP turbine 19 for cooling purposes and the other flow 23a flows through the heat generator 18 at the low-pressure end. In this configuration, the actuating element 10b upstream of the LP turbine 19 is open whereas the other actuating element 10a, downstream of the heat generator 18, is closed. In the case of series connection, the actuating element 10b is closed. The whole of the partial cooling gas flow 23 flows to the heat generator 18 via the conduit 23a and subsequently to the LP turbine 19 via a further conduit 23b. It is clear that in the configuration last mentioned, the actuating element 10a downstream of the heat generator 18 is open.

Furthermore, it is obvious that the cooling technique in the heat generator 18 depends on the type of cooling used for the structures, i.e. whether the cooling is carried out in parallel or in series. The pressure drops of this partial cooling gas flow can also be achieved by means of a booster fan 26 which is placed somewhere in the supply 23 of the cooled exhaust gas flow to the LP turbine, i.e. in the turbine cooling air 21, preferably at the coldest location of this supply conduit 23.

In addition, it is possible to let the heat exchanger 20 mentioned act in a fuel flow 31 without difficulty—which is advantageous when a gaseous fuel is involved—instead of placing it in the air conduit 4. The heating of the fuel just mentioned then takes place at the same time.

In an additional variant which is not represented, it is also possible to place the heat exchanger 20 in a main flow or auxiliary flow of the steam cycle. The recooling of the exhaust gas flow in the supply conduit 23 can also be effected, as an alternative to or cumulative with the heat exchanger 20, by spraying in a certain quantity of water or steam 24, it then being possible without difficulty—to omit the heat exchanger 20 completely in certain cases. Due to the measure mentioned last, there is an increase in the cooling medium flow for the LP turbine 19 so that the extraction at the end of expansion 16 must, if need be, be throttled. It is preferable to keep the amount of water or steam 24 sprayed in small because, in addition to the loss of water, it also causes a reduction in the efficiency. On the other hand, it should be mentioned that the electrical power generated is increased by this measure.

Where steam 24 is sprayed in, a maximized, desired increase in pressure for the cooling gas distribution in the LP turbine 19 can be achieved with the aid of a jet apparatus or a mixing location 25. The steam 24 to be sprayed in can be of any given origin. It is advantageous to extract it from the exhaust heat boiler 29 or from the steam turbine 30 of the steam cycle 33, such a steam cycle being described, for example, in EP-B1-0 150 340.

The reduction in the temperature in the exhaust gas flow 17 to the level necessary for cooling the LP turbine 19 can also take place by an admixture of colder air, which can take place via the water or steam supply 24. In the through-connected gas turbine operation, this air is preferably extracted at an appropriate tapping location 28 in the compressor 1b. The extraction can also, of course, take place from the air conduit 4, the function of the jet apparatus 25 for increasing the pressure of the cooling air being then applied in this case also.

A cleaning unit 22 placed in the supply conduit 23 of the exhaust gas flow to the LP turbine 19 ensures that the turbine exhaust gases used for cooling can, depending on the fuel used, be cleaned.

Another favorable solution for the turbine and heat generator cooling, particularly in the case of combined installations, can take place by means of steam.

The fuel 31 necessary for feeding the heat generator 7 at the high-pressure end and the heat generator 18 at the low-pressure end is, in order to minimize energy losses, preheated as far as possible in counterflow to the combustion gases in the waste heat boiler 29 of the steam process 33 unless, as described above, it is used for recooling the turbine cooling air 21.

Obviously, numerous modifications and variations of the present invention are possible in light of the above teachings. It is therefore to be understood that within the scope of the appended claims, the invention may be practised otherwise than as specifically described herein.

| Designation list | |
|---|---|
| 1a, 1b | Compressors |
| 2 | Intercooler |
| 3 | Induced air |
| 4 | Air conduit from the compressor |
| 5 | Cavern |
| 6 | Air conduit from and to the cavern |
| 7 | Heat generator |
| 8, 9, 10 | Actuating elements |
| 10a, 10b | Actuating elements |
| 11 | Heat exchanger |
| 12 | Conduit system in the cavern region |
| 13 | Heat accumulator |
| 14 | Electrical machine |
| 15 | High-pressure turbine |
| 16 | Cooling gas extraction location |
| 17 | Cooling gas conduit |
| 18 | Heat generator |
| 19 | Low-pressure turbine |
| 20 | Heat exchanger |
| 21 | Cooled exhaust-gas flow |
| 22 | Cleaning unit |
| 23 | Cooling gas flow |
| 23a, 23b | Cooling gas flows |
| 24 | Water or steam conduit |
| 25 | Jet apparatus or mixing location |
| 26 | Booster fan |
| 27 | Tapping conduit |
| 28 | Tapping location |
| 29 | Waste heat boiler |

-continued

| Designation list | |
|---|---|
| 30 | Steam turbine |
| 31, 31a | Fuel conduits |
| 32 | Gas turbine group |
| 33 | Steam cycle |
| 34 | Air storage installation |

What is claimed as new and desired to be secured by Letters Patent of the United States is:

1. A method of operating a gas turbine group, having at least one compressor, at least a high pressure gas turbine, a low pressure gas turbine and at least one electrical machine, comprising the steps of:
   operating a first heat generator upstream of the high pressure gas turbine;
   operating a second heat generator downstream of the high pressure gas turbine;
   extracting a partial mass flow from the high-pressure turbine;
   cooling this partial mass flow by a cooler medium; and,
   passing the cooled partial mass flow through the structures of at least one of the second heat generator and a low pressure turbine as a cooling medium.

2. The method as claimed in claim 1, wherein the partial mass flow for cooling is passed through a heat exchanger through which flows an airflow.

3. The method as claimed in claim 2, wherein the airflow originates from at least one of a compressor of the gas turbine group and an air storage installation.

4. The method as claimed in claim 1, wherein the gas turbine group includes a steam turbine circuit, and wherein the partial mass flow for cooling is passed through a heat exchanger through which flows at least a partial flow of the steam circuit.

5. The method as claimed in claim 1, wherein the partial mass flow for cooling is passed through a heat exchanger through which flows a fuel flow.

6. The method as claimed in claim 1, wherein the partial mass flow is cooled by spraying in at least one of water and steam.

7. The method as claimed in claim 1, wherein the second heat generator an low pressure turbine to be cooled are cooled by the mass flow in parallel.

8. The method as claimed in claim 1, wherein the cooled partial mass flow is passed through a heat generator at the low-pressure end and a low-pressure turbine.

9. The method as claimed in claim 1, wherein the partial mass flow is passed through a cleaning unit before flowing through the structures to be cooled.

10. The method as claimed in claim 1, wherein the partial mass flow is passed through a fan before flowing through the structures to be cooled.

11. The method as claimed in claim 1, wherein the second heat generator and low pressure turbine are cooled in series.

12. The method as claimed in claim 1, wherein the partial mass flow is passed through a jet apparatus, in which steam is injected into the mass flow to cool the mass flow and increase the pressure, before the mass flow is passed through the structures to be cooled.

13. The method of operating a gas turbine group as claimed in claim 1, wherein the cooling medium is passed through the structures of the second heat generator and to the low pressure turbine in series before mixing with a working gas flowing through the low pressure turbine.

14. The method of operating a gas turbine group as claimed in claim 1, wherein the cooling medium is passed through the structure of the low pressure turbine before mixing with a working gas flowing through the low pressure turbine.

* * * * *